United States Patent [19] [11] Patent Number: 4,554,988
Ludwig et al. [45] Date of Patent: Nov. 26, 1985

[54] METHOD AND SYSTEM FOR DISPLAYING RELATIVE VALUES ON A MULTI-SEGMENT DISPLAY

[75] Inventors: Peter Ludwig, Mönchaltorf; Meinrad Steiner, Greifensee, both of Switzerland

[73] Assignee: Mettler Instrumente AG, Greifensee, Switzerland

[21] Appl. No.: 576,550

[22] Filed: Feb. 3, 1984

[30] Foreign Application Priority Data

Mar. 3, 1983 [CH] Switzerland ............... 1158/83

[51] Int. Cl.$^4$ ............................................. G01G 23/30
[52] U.S. Cl. ................................ 177/178; 177/DIG. 3
[58] Field of Search .............. 177/1, 177, 178, DIG. 3

[56] References Cited

U.S. PATENT DOCUMENTS 4,076,088 2/1978 Gallo et al. ................... 177/177 X
4,200,896 4/1980 Baumann ..................... 177/177 X Primary Examiner—George H. Miller, Jr.
Attorney, Agent, or Firm—Erwin S. Teltscher

[57] ABSTRACT

When a measuring instrument normally displaying digital values by selective energization of a multi-segment display is used to furnish only qualitative information as to the relationship of the measured value to a reference value or values, the result is indicated only by the position on the display of a horizontal line. Since the change in position is limited by the position of the top and bottom segments constituting the digital display, the read-out of these conventional scales is difficult, particularly when carried out from different angles. To eliminate this problem, a reference mark or marks are supplied. The position of the weight dependent marks relative to the reference mark is clear, eliminating read-out errors. The reference mark may be a permanent mark on a transparent sheet mounted in front of the display. Alternatively, the reference marks can be created by activation of segments in places of the display not required for generating the weight dependent marks.

15 Claims, 8 Drawing Figures

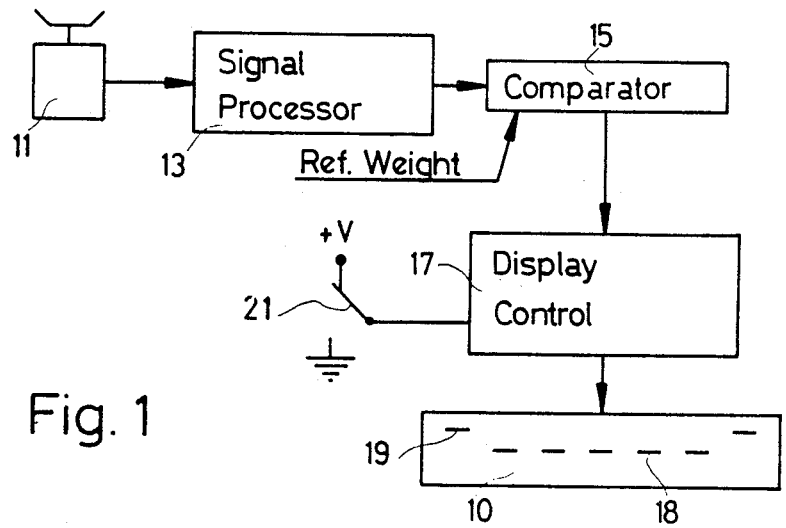
Fig. 1
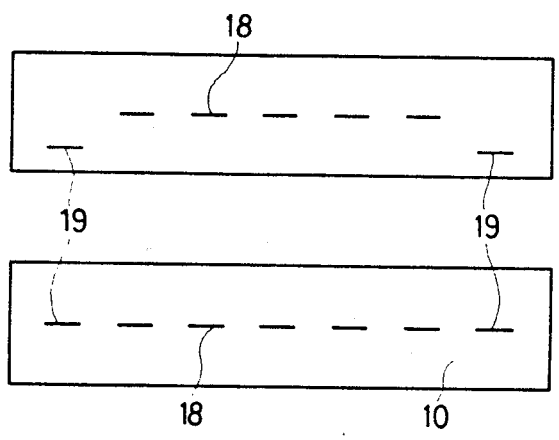
Fig. 2
Fig. 3

METHOD AND SYSTEM FOR DISPLAYING RELATIVE VALUES ON A MULTI-SEGMENT DISPLAY

Cross reference to related applications and publications: U.S. Pat. No. 4,200,896.

This patent is incorporated by reference into the present application, with particular reference to FIG. 1.

FIELD OF THE INVENTION

The present invention relates to measuring instruments having multi-segment digital displays. In particular, it relates to apparatus and methods for activating such displays to indicate only whether the measured value is greater or less than a reference value.

BACKGROUND OF THE INVENTION

The present invention will be described relative to a balance or scale, even though it is suitable for any measuring instrument having a multi-segment display. In general, a seven segment indicator having three at least approximately horizontal and four at least approximately vertical segments will be concerned. However, displays with a greater or lesser number of segments, as well as displays utilizing points rather than segments to construct the symbols, are to be included.

A balance of the type described herein is disclosed in U.S. Pat. No. 4,200,896 (corresponding to Swiss Pat. No. 618,508). In this balance, the numerical display may be replaced by a qualitative display when desired. This may be the case when the actual measured value is not of interest, but only whether the measured weight exceeds or is less than a reference weight. Under these conditions, in the known scale, the position of a line of horizontal segments indicates the result of the comparison: Segments of the upper row are illuminated when the weight exceeds the reference value, while those in a lower row are illuminated when the measured value is less than the reference value. A middle row of horizontal segments is used to indicate that the measured value is within a certain region, that is greater than a lower limit value and less than an upper limit value.

This type of display has the following disadvantage: Unless the operator looks at the display from a close distance, it is difficult to tell exactly whether the illuminated horizontal segments are in the middle or upper (or possibly lower) row. It is easy for an operator to make a mistake and thereby arrive at incorrect conclusions.

SUMMARY OF THE INVENTION

It is an object of the present invention to remove the above difficulty, namely to allow the operator to read the display accurately even from a distance and under rush conditions. The greater ease and accuracy of reading the display is to be accompanied by a minimal increase in complexity and cost of the equipment.

In accordance with the present invention, the above problem is to be solved by creating a position reference mark on the display. The position of the horizontal line relative to the reference mark is then easy to determine, independent of the angle of view.

This general concept can be implemented in many ways. For example, the line indicative of the measured weight (herein referred to as the first mark) may always be the center line. The reference mark then appears in the upper, middle, or lower row, depending upon the relationship of the measured value to the reference value. A preferred embodiment is the opposite of this arrangement. In the preferred embodiment, the reference mark stays in the same position and the first mark indicative of the measured value changes position. In this embodiment, the reference mark may be a fixed mark on a sheet covering the display.

In the second preferred embodiment, the reference mark is created by energization of one or more display segments. No additional segments are required for creating the mark since generally, in a multiplace display, all the places required for numeric display are not required for the qualitative display.

In a preferred embodiment, the reference mark has the shape of a square bracket.

In another embodiment, the reference mark is a single horizontal segment.

The readability of the display can be further improved by use of two reference marks, rather than one reference mark. Preferably, the first reference mark is arranged to the left and the second reference mark to the right of the horizontal segment or segments which indicate the measured value. This allows rapid and correct reading of the display from both the right and the left side.

The method of the present invention relates to a measuring instrument in which the measured value is to be compared to at least one reference value. The result of the comparison is conveyed by the relative position on the display of a reference mark and a mark indicative of the measured value. The latter is, preferably, a horizontal line. When this is the case, two reference marks should be used, one to the left and one to the right of the horizontal line.

The present invention both as to its construction and its method of operation, together with additional objects and advantages thereof, will best be understood from the following description of preferred embodiments when read in connection with the accompanying drawing.

BRIEF DESCRIPTION OF THE DRAWING

FIG. 1 is a schematic block diagram of a measuring instrument according to the present invention;

FIG. 2 is a schematic diagram of an alternate display to that of FIG. 1;

FIG. 3 is a schematic diagram illustrating a third alternative to the display of FIG. 1;

DESCRIPTION OF THE PREFERRED EMBODIMENTS

Figure 4:
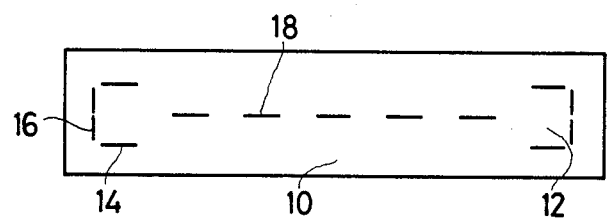
FIG. 4 is a schematic diagram of a display of a second embodiment of the present invention.

The first embodiment is illustrated in FIGS. 1–3. Referring first to FIG. 1, a balance 11 furnishes a weight signal which is processed and digitalized in circuit 13. Any required tare operation takes place here. A digital net weight signal is applied to a two stage comparator 15. An upper and a lower reference value are also applied to the comparator. The output of the comparator is applied to a display control circuit 17, which in turn is applied to a seven place digital display 10.

Operation of a selector switch 21 determines whether display 10 furnishes a numeric display or a qualitative display utilizing only horizontal segments 18. One or more of the latter is referred to as "first mark" herein. In this embodiment, a reference mark 19 is arranged both to the left and to the right of segments 18. Segments 18 are always in the middle row, while reference marks 19 have a position which depends upon the output signal of the comparator, as follows:

If the net weight is less than the smaller reference value, both reference marks 19 appear in the upper line, as illustrated in FIG. 1.

If the measured weight is greater than the upper reference value, both reference marks 19 appear in the lower row as illustrated in FIG. 2.

If the measured weight is between the two reference weights, the reference marks are also in the center row, as illustrated in FIG. 3.

If only one reference value is involved, that is if it is to be decided only whether the measured value is greater or less than a given reference value, only this reference value is applied to comparator 15. The output of comparator 15 then determines whether the display is that of FIG. 1 or that of FIG. 2.

The individual units constituting a balance operating as above are illustrated only schematically as in their interconnection. Anyone skilled in the art would have no problem implementing the invention on the basis of these block diagrams alone. In addition, the detailed logic circuitry of U.S. Pat. No. 4,200,896 can readily be modified to encompass the present invention, as discussed below.

Specifically, the above described displays, namely the displays of FIGS. 1–3 can be implemented by applying the upper and lower reference values to inputs 22 and 23 of reference stores 24 and 25, respectively. Decoder 18 of U.S. Pat. No. 4,200,896 is included in display control unit 17 of the present system, while selector switch 32 of the patent corresponds to switch 21 herein. To generate the displays of FIGS. 1, 2, and 3 of the present invention, decoder 18 would have to be modified so that segments 18 are permanently energized upon activation of selector switch 32 to supply voltage to multiplexer 17. Further, it should be noted that, when the measured weight is less than the reference value (FIG. 1), the decoder input would be identical to that generating the display of FIG. 4 in the patent. The decoder for the present system would thus be wired to energize the segments 19 illustrated in FIG. 1 herein in response to that input. For the inputs energizing the display shown in FIG. 6 of the patent, segments 19 illustrated in FIG. 3 would be activated. Finally, decoder 18 would be rewired to energize the bottom segments 19, as illustrated in FIG. 2, when the measured weight exceeds the upper reference value.

For all net weight values below the lower reference value, the output of the decoder would maintain the display of FIG. 1. For all values between the two reference values, the decoder would maintain the display of FIG. 3. Finally, the display of FIG. 2 would be maintained for any net weight value which exceeds the upper reference value.

Since the changes in the system in U.S. Pat. No. 4,200,896 required to implement the remaining embodiments are equally minor, they will not be discussed in detail.

It would of course also be possible to implement the whole system utilizing a microcomputer.

Figure 5:
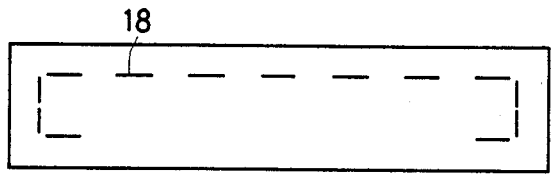
FIG. 5 is a schematic diagram of an alternative display to that of FIG. 4.

The second embodiment of the present invention is illustrated in FIGS. 4 and 5. In this, as in all of the embodiments described below, the position of the reference mark remains unchanged, while that of the first, weight indicative mark changes.

In the second embodiment, reference marks 12 are brackets including horizontal segments 14 and vertical segments 16. Comparator 15 operates with two reference values. Depending upon the output of this comparator, segments 18 are in the following positions:

In the center row (FIG. 4) when the weight is between the two reference values;

In the upper row (FIG. 5) when the measured weight exceeds the upper reference value; and In the lower row (not illustrated), when the weight is below the lower reference value.

Figure 6:
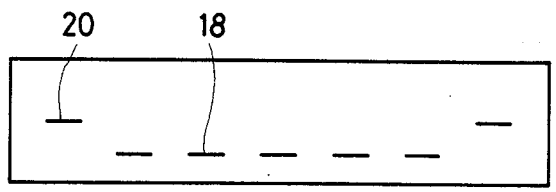
FIG. 6 is a schematic diagram of a display of a third embodiment of the present invention.
Figure 7:
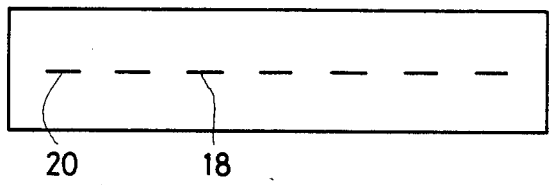
FIG. 7 is an alternative display to that of FIG. 6.

The third embodiment is illustrated in FIGS. 6 and 7. This is one of the simpler embodiments, in which reference mark 20 is constituted by a single horizontal segment, similar to the first embodiment.

As in the second embodiment, the position of reference marks 20 remain unchanged, while the first mark 18 appears in the upper row for the higher weight range (not illustrated), in the lower row when in the lowest weight range (FIG. 6), and in the same row as the reference mark (FIG. 7), when the weight is in an intermediate weight range.

Figure 8:
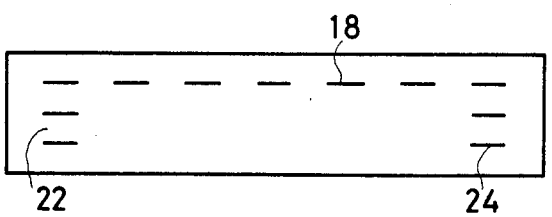
FIG. 8 is a schematic diagram of a display of a fourth embodiment of the invention.

The fourth embodiment is illustrated in FIG. 8. In this embodiment, reference marks 22 are formed by three horizontal segments 24 positioned one on top of the other. This allows a particularly clear display of the one of three ranges into which the measured value falls. FIG. 8 illustrates the display when the measured value exceeds the upper reference value, that is when the weight is in the topmost range. For the intermediate and lower ranges, segments 18 would then of course, line up with the corresponding ones of segments 24. If the weight is to be classified into one of two ranges only, the middle segment 24 may be eliminated.

Many other variations of the present invention are possible. Not only may the type of display be varied, but also the type of signal processing. For example, an analog comparator could be substituted for the digital comparator.

The invention is also not to be limited to classification in one of three ranges. A dot matrix display, in conjunction with a comparator to which four reference values are applied, can be used to furnish an unequivocable optical display of weight in one of five weight ranges. Alternatively, a seven segment display can be used for more than three weight ranges if the first marks are vertical rather than horizontal segments. Increasing weight values will then be represented by positions from left to right, rather than up and down, in the display.

While the invention has been illustrated in preferred embodiments, it is not to be limited to the circuits and structures shown, since many variations thereof will be evident to one skilled in the art and are intended to be encompassed in the present invention as set forth in the following claims.

We claim:

1. In a measuring instrument having analog-to-digital converter means and digital processing means postcoupled to said analog-to-digital converter means for generating a signal signifying a measured value, display means comprising a display and first and second sets of elements for creating symbols signifying said measured value on said display upon selective energization by said signal, and means for temporarily deactivating said first set of elements and selectively energizing only said second set of elements to create a measurement mark at a position on said display indicative of a range of values including said measured value, the improvement comprising reference mark supplying means connected to an input of said digital processing means for furnishing a reference mark processed by said digital processing means for positioning said reference mark relative to said measurement mark so as to indicate the value of said range of measured values relative to a reference value, and simultaneously with said reference value on said display, whereby read-out from said display is so as to be readable over a large angle of view of said display.

2. A measuring instrument as set forth in claim 1, wherein said reference mark is created in a fixed position independent of the position of said measurment mark.

3. A measurement instrument as set forth in claim 1, wherein said reference mark supplying means includes memory means for storing said reference mark.

4. A measurement instrument as set forth in claim 1, wherein said range of measured values includes a range of $10^7$ digits, and wherein said reference mark is settable within one digit of said range of measured values.

5. A measurement instrument as set forth in claim 1, wherein said value of said range of measured values may differ from said reference value by a range defined by a plurality of bits, and wherein the resolution of said reference value is a bit defined as a least significant bit, said resolution being constant over the entire range of said measured values.

6. A measurement instrument as set forth in claim 1, wherein the reference mark displayed on said display is indicative only of the difference between said range of measured values and a preset value, and is free from displaying a value range lower than said range of measured values.

7. A measuring instrument as set forth in claim 1, wherein said reference mark is above or below said measurement mark when said reference value is, respectively, greater or less than said measured value.

8. A measuring instrument as set forth in claim 7, wherein said reference mark comprises a left and right reference mark positioned to the left and right of said measurement mark, respectively.

9. A measurement instrument as set forth in claim 1, further comprising switching means connected to said digital processing means settable to a first position instructing said digital processing means to simultaneously display said reference mark and said measurement mark on said display in an analog manner, and to a second position instructing said digital processing means to display said measured value in a digital manner.

10. A measurement instrument as set forth in claim 9, wherein said digital processing means uses substantially identical components to display one of said manners.

11. A measurement instrument as set forth in claim 9, wherein said display of said digital manner is a display in BCD format, said display in said analog manner being compatible with said BCD format.

12. A measuring instrument as set forth in claim 1, wherein said first set of elements is a set of at least approximately vertical segments and said second set of elements is a set of at least approximately horizontal segments.

13. A measuring instrument as set forth in claim 2, wherein said reference mark comprises at least one of said horizontal segments.

14. A measuring instrument as set forth in claim 2, wherein said reference mark has the shape of a bracket.

15. A measuring instrument as set forth in claim 2, wherein said measurement mark comprises at least one horizontal segment;

and wherein said reference mark comprises a first and second reference mark positioned, respectively, to the left and right of said horizontal segment.

* * * * *